(12) United States Patent
Liang

(10) Patent No.: US 7,506,191 B2
(45) Date of Patent: Mar. 17, 2009

(54) ACCESS DEVICE CAPABLE OF ACCESSING STORAGE DEVICES IN A COMPUTER

(75) Inventor: Bor-Sung Liang, Kaohsiung (TW)

(73) Assignee: Sunplus Technology Co., Ltd., Hsinchu (TW)

( * ) Notice: Subject to any disclaimer, the term of this patent is extended or adjusted under 35 U.S.C. 154(b) by 415 days.

(21) Appl. No.: 11/313,677

(22) Filed: Dec. 22, 2005

(65) Prior Publication Data

US 2006/0265607 A1 Nov. 23, 2006

(30) Foreign Application Priority Data

May 23, 2005 (TW) .............................. 94116725 A

(51) Int. Cl.
*G06F 1/00* (2006.01)
*G06F 1/26* (2006.01)
*G06F 1/32* (2006.01)

(52) U.S. Cl. ........................ 713/323; 713/300; 713/320

(58) Field of Classification Search .................. 713/323
See application file for complete search history.

(56) References Cited

U.S. PATENT DOCUMENTS

| 5,867,733 | A * | 2/1999 | Meyer ......................... 710/74 |
| 6,625,738 | B1 * | 9/2003 | Shiga ......................... 713/310 |
| 2001/0021976 | A1 * | 9/2001 | Shibuya et al. .............. 713/169 |
| 2004/0172527 | A1 * | 9/2004 | Ono et al. .................... 713/100 |

* cited by examiner

*Primary Examiner*—Thomas Lee
*Assistant Examiner*—Michael J Brown
(74) *Attorney, Agent, or Firm*—Bacon & Thomas, PLLC

(57) ABSTRACT

An access device is capable of accessing storage devices in a computer, which includes a controller, a first interface, a second interface, a third interface, and a power detector. The first interface connects the controller to a storage device of the computer. The second interface connects the controller to a plug-in storage device. The third interface is a combination of the first interface and the second interface and connects the controller to the computer. The power detector detects the computer at power-on or not. When the computer is powered on, the controller bypasses the first interface and the second interface to the third interface. When the computer is at doze or shutdown, the controller actively controls devices connected to the first interface and the second interface.

18 Claims, 7 Drawing Sheets

ACCESS DEVICE CAPABLE OF ACCESSING STORAGE DEVICES IN A COMPUTER

BACKGROUND OF THE INVENTION

1. Field of the Invention

The invention relates to the technical field of data access and, more particularly, to an access device capable of accessing storage devices in a computer.

2. Description of Related Art

Among current computer systems, a storage device has played an important role, which can store application programs, operating systems, personal information, and even photos and video files. FIG. 1 is a diagram of a personal computer configuration. As shown in FIG. 1, after power-on, the CPU 13 of the computer loads the operating system to a memory 12 (e.g., a RAM) from a storage device 11 (e.g., a hard disk) for execution. The storage device 11 typically requires the help of the operating system for a normal read/write. In this case, when the personal computer cannot be powered on as usual, the data content of the storage device 11 cannot be read. A solution is to apply an operating system of another device (e.g., a floppy or compact disk) to power on the computer and then to drive the storage device 11, or to demount the storage device 11 and then to plug it to a normal system for data read. However, only skilled technicians or engineers can perform such an operation, while general users may find it difficult to execute.

In addition, currently plug-in storage devices (e.g., USB portable disks or memory cards) can provide data storage and portability functions. For reading the data of the plug-in storage devices and storing the data into the storage device 11 of the personal computer, it requires powering on and manually operating the personal computer. Accordingly, the user has to turn on the personal computer and wait for a booting time, and must be skilled in operating the personal computer. Further, the personal computer is increasingly popular and widely used in, for example, monitoring and video-recording applications to record audiovisual data in the storage device 11. However, when recording audiovisual data streams, the personal computer is kept on, which requires huge power consumption, and the system for monitoring and recording is complicated, resulting in poor system security and stability.

Therefore, it is desirable to provide an improved access device capable of accessing storage devices in a computer to mitigate and/or obviate the aforementioned problems.

SUMMARY OF THE INVENTION

The object of the invention is to provide an access device capable of accessing storage devices in a computer, which can read and move the data of a storage device without computer power-on, and allow a peripheral connection interface to work at computer shutdown or standby.

According to one aspect of the invention, an access device capable of accessing storage devices in a computer is provided. The device includes a controller, a first interface, a second interface, a third interface and a power detector. The first interface connects the controller to a storage device of the computer. The second interface connects the controller to a plug-in storage device. The third interface is a combination of the first interface and the second interface and connects the controller to the computer. The power detector detects whether the computer is powered on or not. When the computer is powered on, the controller bypasses the first interface and the second interface to the third interface. When the computer at doze or shutdown is detected, the controller actively controls devices connected to the first interface and the second interface.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
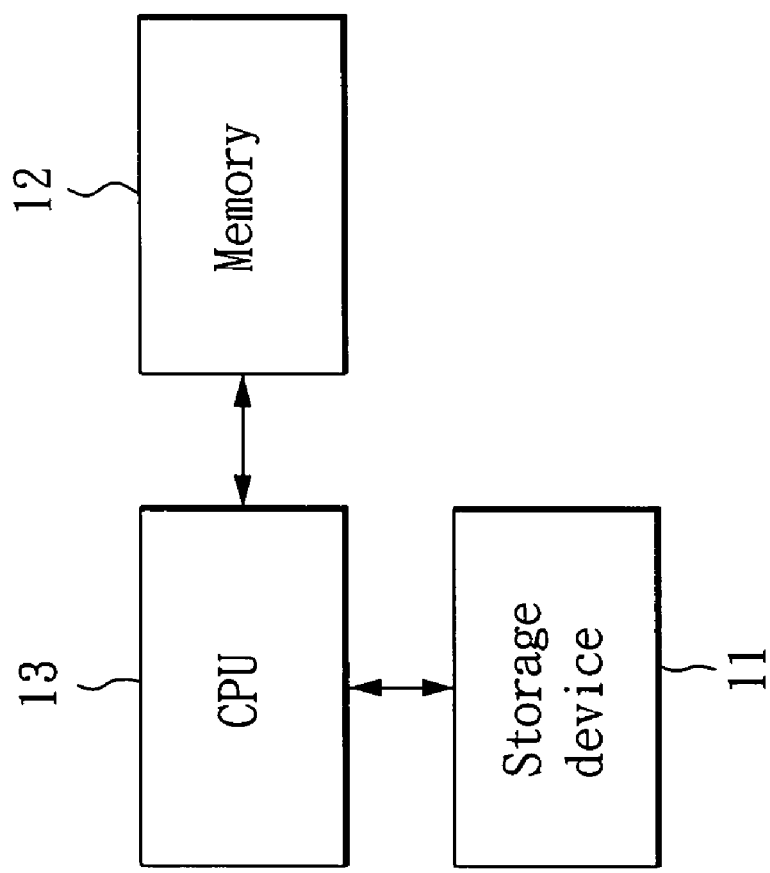
FIG. 1 is a diagram of a personal computer configuration.
Figure 2:
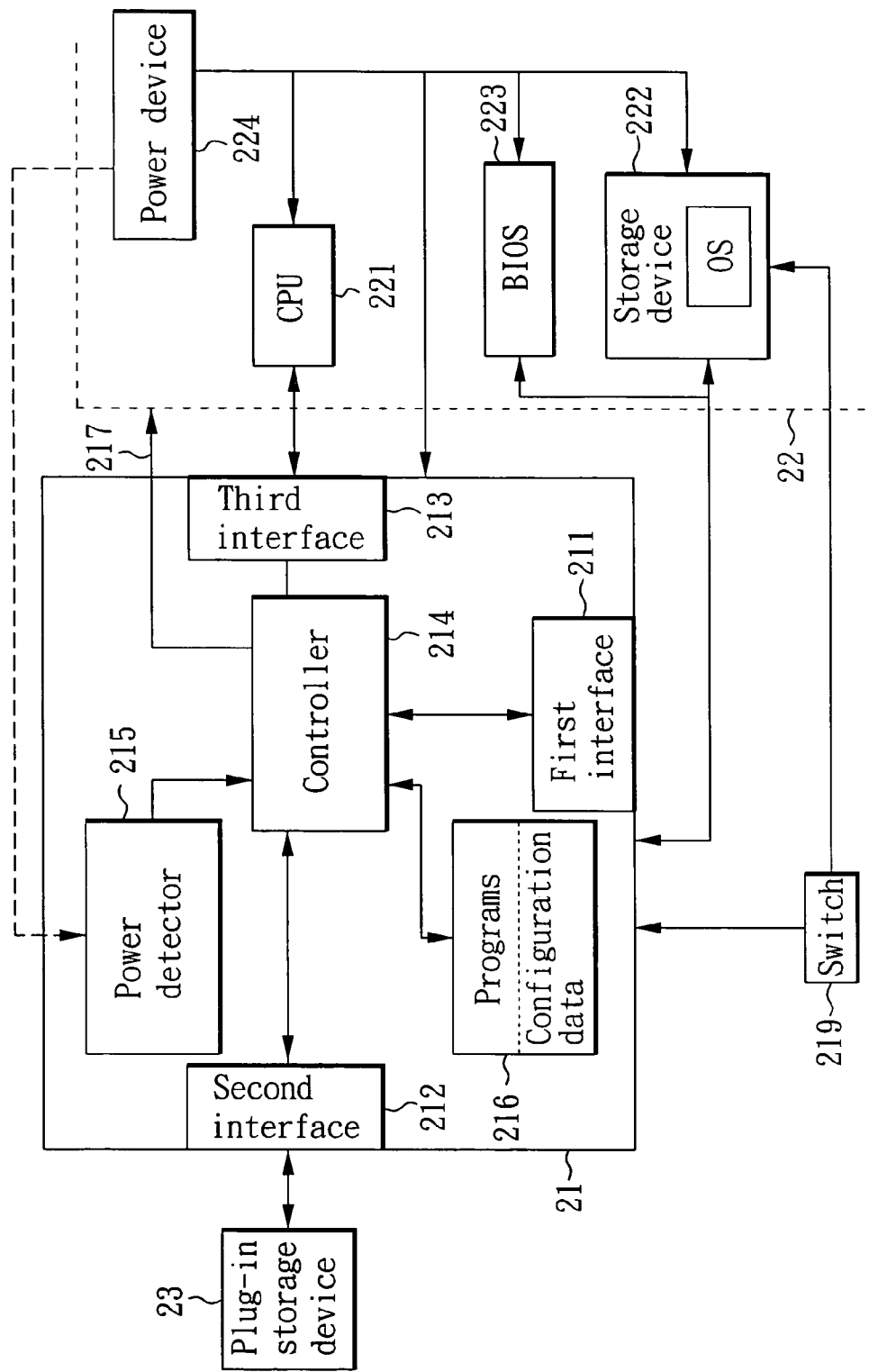
FIG. 2 is a block diagram of an access device capable of accessing storage devices in a computer according to the invention.

FIG. 2 is a block diagram of an access device 21 capable of accessing storage devices in a computer according to the invention. As shown in FIG. 2, the access device 21 is implemented in, for example, a personal computer 22. The personal computer 22 essentially has a CPU 221, a storage device 222, a BIOS 223 and a power device 224. The storage device 222 can be a hard disk, for example. When the personal computer 22 is powered on, the CPU 221 accesses the storage device 222 or a plug-in storage device 23 as usual. When the personal computer 22 is at doze or shutdown, the access device 21 can access the storage device 222 or the plug-in storage device 23.

The access device 21 has a controller 214, a first interface 211, a second interface 212, a third interface 213, a power detector 215 and a memory 216. The controller 214 can be a RAID, Port Multiplier or CD cabinet controller, which has a sufficient computational capability to perform simple functions such as programmed data move. The first interface 211 can be an IDE, SATA, SCSI or IEEE 1394 interface, which connects the controller 214 to the storage device 222 and the BIOS 223. The second interface 212 can be a USB, SD, SDIO or CF interface, which connects the controller 214 to the plug-in storage device 23. The third interface 213 is a combination of the first interface 211 and the second interface 212, which connects the controller 214 to the CPU 221 of the personal computer 22. The power detector 215 has an input terminal connected to the power device 224 and an output terminal connected to the controller 214. The memory 216 preferably is a flash memory, which stores configuration data and programs to be executed by the controller 214. The controller 214 is further connected to the personal computer 22 through a control line 217 and accordingly sends an activating signal to wake up or power on the personal computer 22.

The personal computer 22 is designed to supply power to the access device 21 and the storage device 222 even if the computer 22 is at doze or shutdown, or to wake up the access device 21 and the storage device 222 at doze or shutdown by an external control. For example, the power of the second interface 212 is reserved to activate the second interface 212 to thus wake up or activate the access device 21 and the storage device 222 when the plug-in storage device 23 is inserted, or a waking/activating switch 219 is implemented and operated to wake up or activate the access device 21 and the storage device 222. The switch 219 can be a button to be pressed by a user or by the plug-in storage device 23 inserted, or an photoelectric switch, infrared or photosensor to accordingly wake up or activate the access device 21 and the storage device 222 through automatic sensing.

The power detector 215 detects the personal computer 22 at a power-on state through the power device 224 when the personal computer 22 is powered and used, and accordingly generates a power-on signal to the controller 214 such that the controller 214 is operated in a passive mode. In the passive mode, the controller 214 bypasses the first interface 211 and the second interface 212 respectively to the third interface 213. Thus, as well as data access in a typical personal computer, the CPU 221 of the personal computer 22 can access the storage device 222 through the third interface 213 and the first interface 211, or the plug-in storage device 23 through the third interface 213 and the second interface 212.

When the personal computer 22 is at doze or shutdown, the access device 21 and the storage device 222 are still powered, or the access device 21 and the storage device 222 are waken up or activated from doze or shutdown. In this case, because the power detector 215 cannot detect the personal computer 22 at a power-on state, the power-on signal is not generated to the controller 214 such that the controller 214 is operated in an active mode and controls devices connected to the first interface 211 and the second interface 212. Accordingly, the controller 214 actively performs data move, comparison or check according to a predetermined program in the memory 216 or by means of external control.

Figure 3:
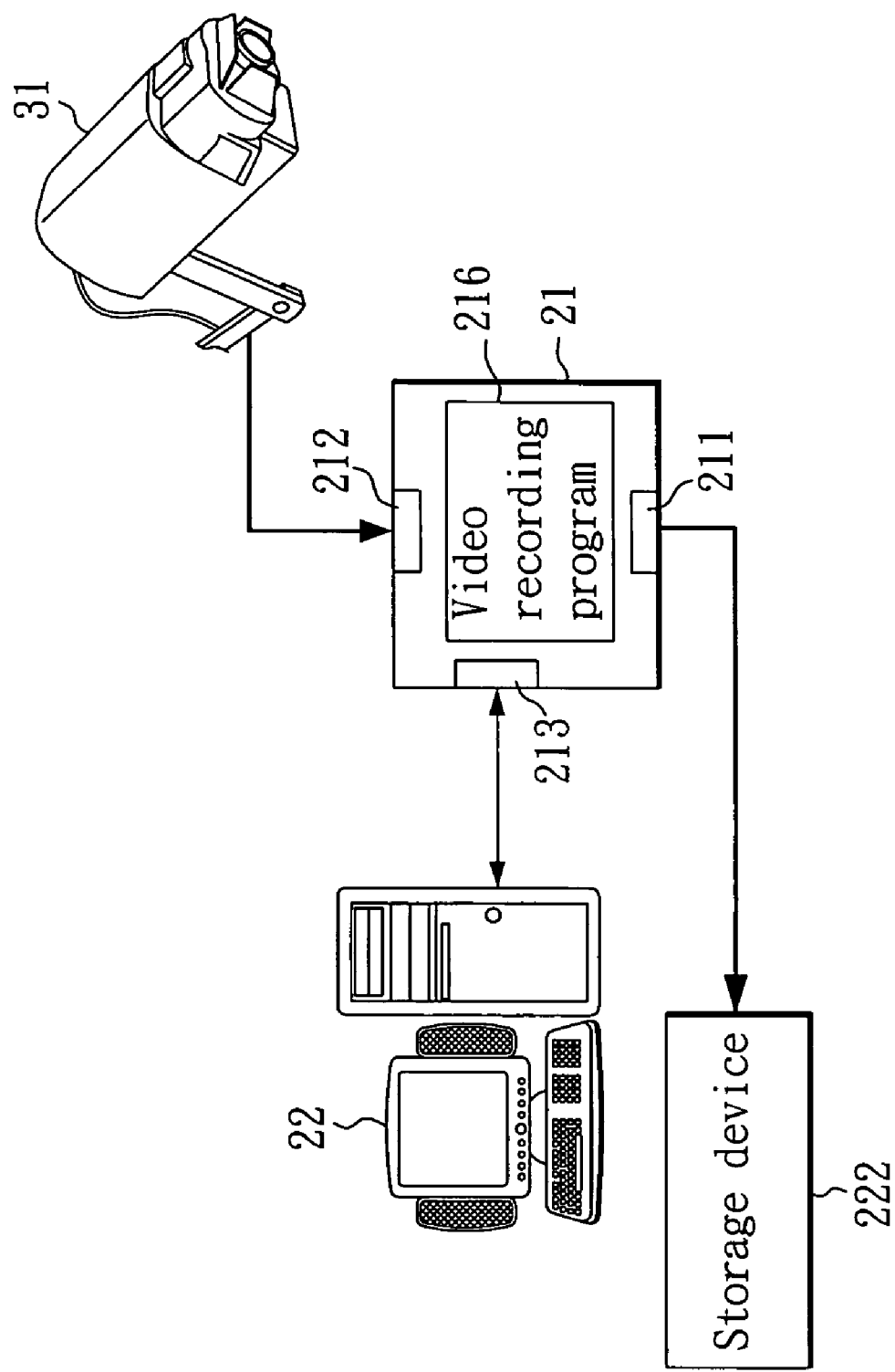
FIG. 3 is a diagram of a first application of FIG. 2 according to the invention.

FIG. 3 is a diagram of an application of the access device 21 of FIG. 2 according to the invention. As shown in FIG. 3, the second interface 212 of the access device 21 is a universal serial bus (USB) interface connected to a monitor camera 31. Accordingly, when the monitor camera 31 is monitoring and recording, the personal computer 22 at power-on obtains images captured by the monitor camera 31 through the second interface 212 and the third interface 213 and stored in the storage device 222. When the personal computer 22 is at doze or shutdown, the controller 214 operated in the active mode obtains the images captured by the monitor camera 31 through the USB interface according to a video recording program in the memory 216 and stored in the storage device 222. Thus, the effect of performing video recording is obtained without powering on the personal computer 22.

Figure 4:
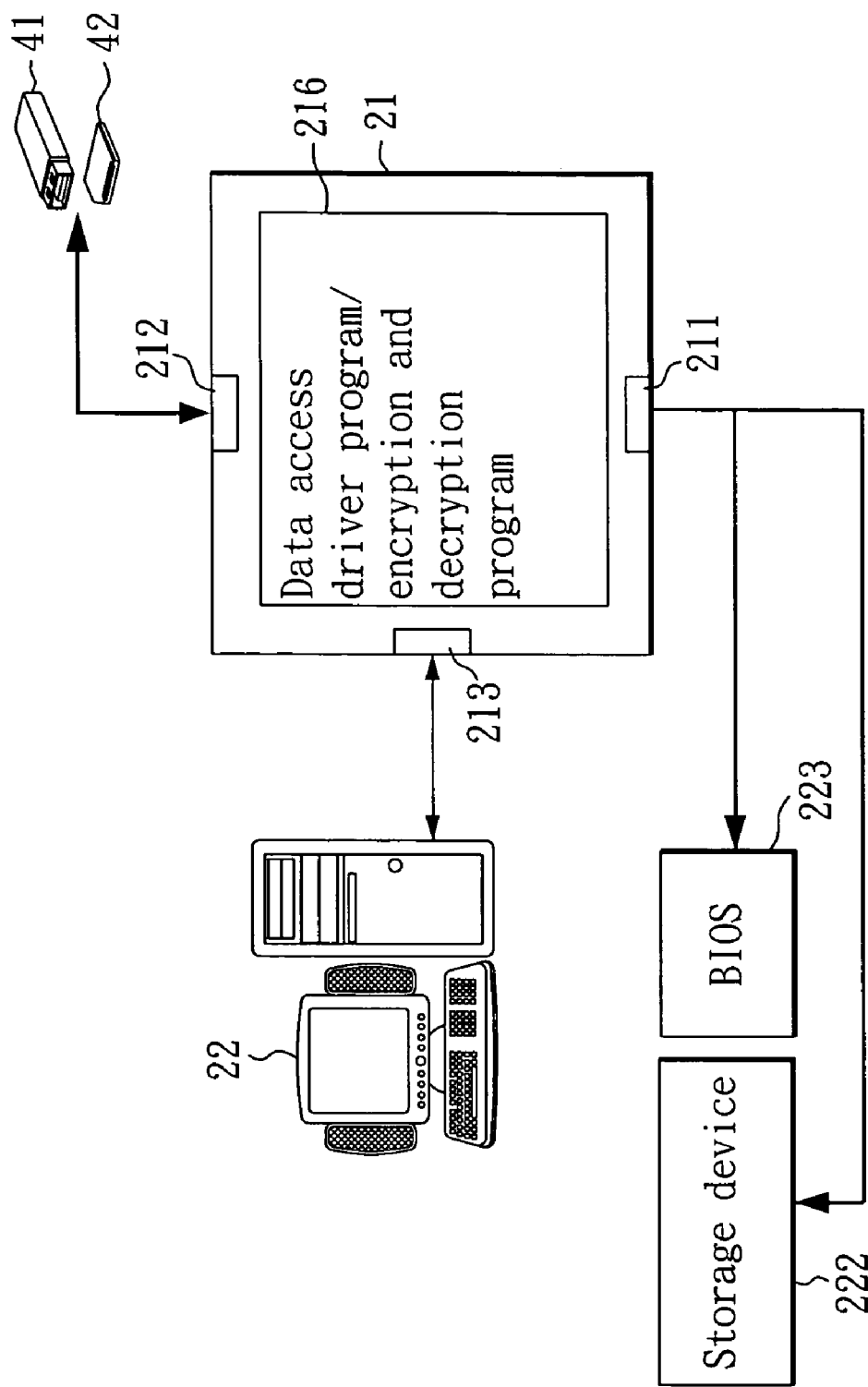
FIG. 4 is a diagram of a second application of FIG. 2 according to the invention.

FIG. 4 is a diagram of another application of the access device 21 of FIG. 2 according to the invention. As shown in FIG. 4, the second interface 212 of the access device 21 is a USB, secure digital memory (SD) or compact flash (CF) interface connected to a USB portable disk 41 or memory card 42. Accordingly, the personal computer 22 at power-on accesses files of the USB portable disk 41/memory card 42 through the second interface 212 and the third interface 213, or transfers the files between the USB portable disk 41/memory card 42 and the storage device 222. When the personal computer 22 is at doze or shutdown, the controller 214 operated in the active mode transfers the files between the USB portable disk 41/memory card 42 and the storage device 222/BIOS 223 through the second interface 212 and the first interface 211 according to a data access driver program in the memory 216. Thus, the effect of performing data access is obtained without powering on the personal computer 22. In addition, the controller 214 can provide data encryption and decryption according to a data encryption and decryption program in the memory 216, so as to protect data of the storage device 222. Furthermore, when the personal computer 22 cannot be turned on successfully because the operating system or BIOS 223 needs to be updated, the controller 214 can write an operating system or BIOS to the storage device 222/BIOS 223 through the second interface 212 and the first interface 211, such that the operating system and BIOS 223 can be updated/recovered easily.

Figure 5:
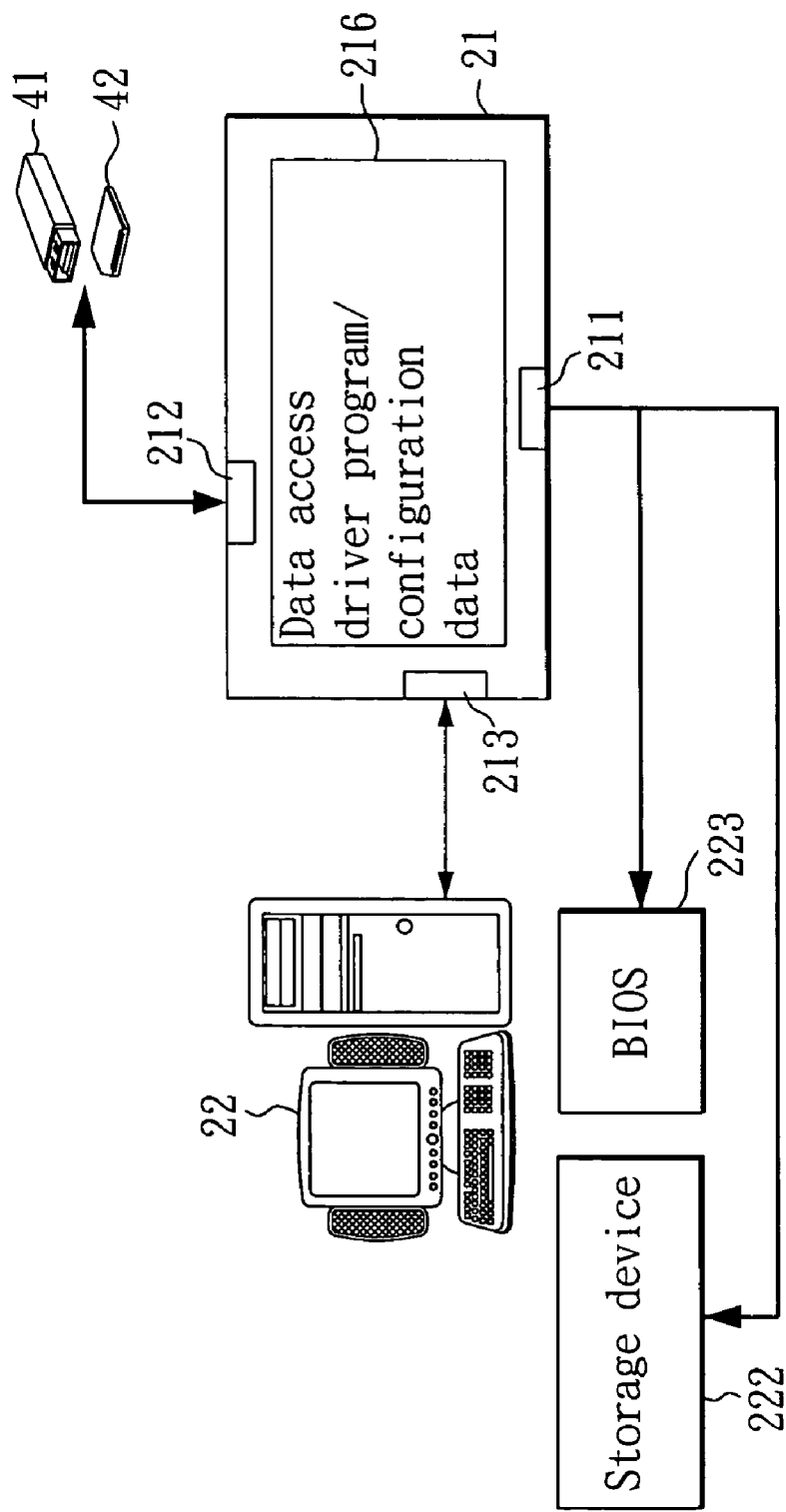
FIG. 5 is a diagram of a third application of FIG. 2 according to the invention.

FIG. 5 is a diagram of another application of the access device 21 of FIG. 2 according to the invention. As shown in FIG. 5, the second interface 212 of the access device 21 is a USB, SD or CF interface connected to a USB portable disk 41 or memory card 42. Accordingly, the personal computer 22 at power-on accesses files of the USB portable disk 41/memory card 42 through the second interface 212 and the third interface 213, or transfers the files between the USB portable disk 41/memory card 42 and the storage device 222. In addition, when the access device 21 is in an active mode, the personal computer 22 can program configuration data in the memory 216 through the third interface 213 and accordingly set an access priority associated with usable hard disk areas/directories, read and write rights and required passwords for the access device 21 in the active mode. Thus, when the personal computer 22 is at doze or shutdown, the controller 214 operated in the active mode transfers the files between the USB portable disk 41/memory card 42 and the storage device 222/BIOS 223 through the second interface 212 and the first interface 211 according to a data access driver program and the configuration data in the memory 216 and the access priority. Thus, the effect of performing data access and using the access priority to limit access is obtained without powering on the personal computer 22.

Figure 6:
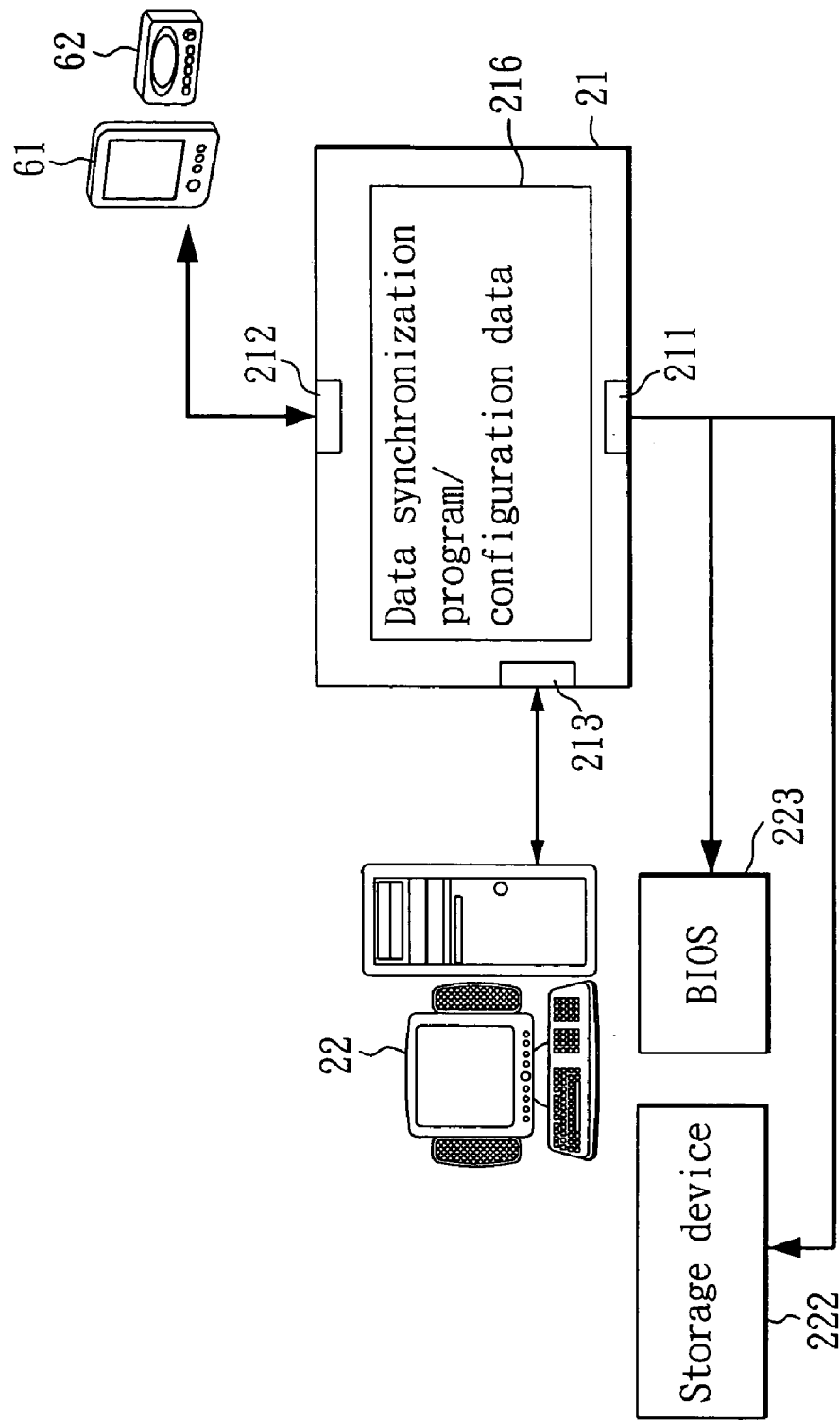
FIG. 6 is a diagram of a fourth application of FIG. 2 according to the invention.

FIG. 6 is a diagram of another application of the access device 21 of FIG. 2 according to the invention. As shown in FIG. 6, the second interface 212 of the access device 21 is a USB interface connected to a PDA 61 or MP3 player 62. The personal computer 22 at power-on can program configuration data in the memory 216 through the third interface 213 and accordingly set synchronization mechanism for the access device 21 in the active mode. Thus, when the personal computer 22 is at doze or shutdown, the controller 214 operated in the active mode compares files of the storage device 222 and the PDA 61 or MP3 player 62 according to a data synchronization program and the configuration data in the memory 216, and transfers updated files between the PDA 61/MP3 player 62 and the storage device 222/BIOS 223 through the second interface 212 and the first interface 211. Thus, the effect of data synchronization is obtained.

Figure 7:
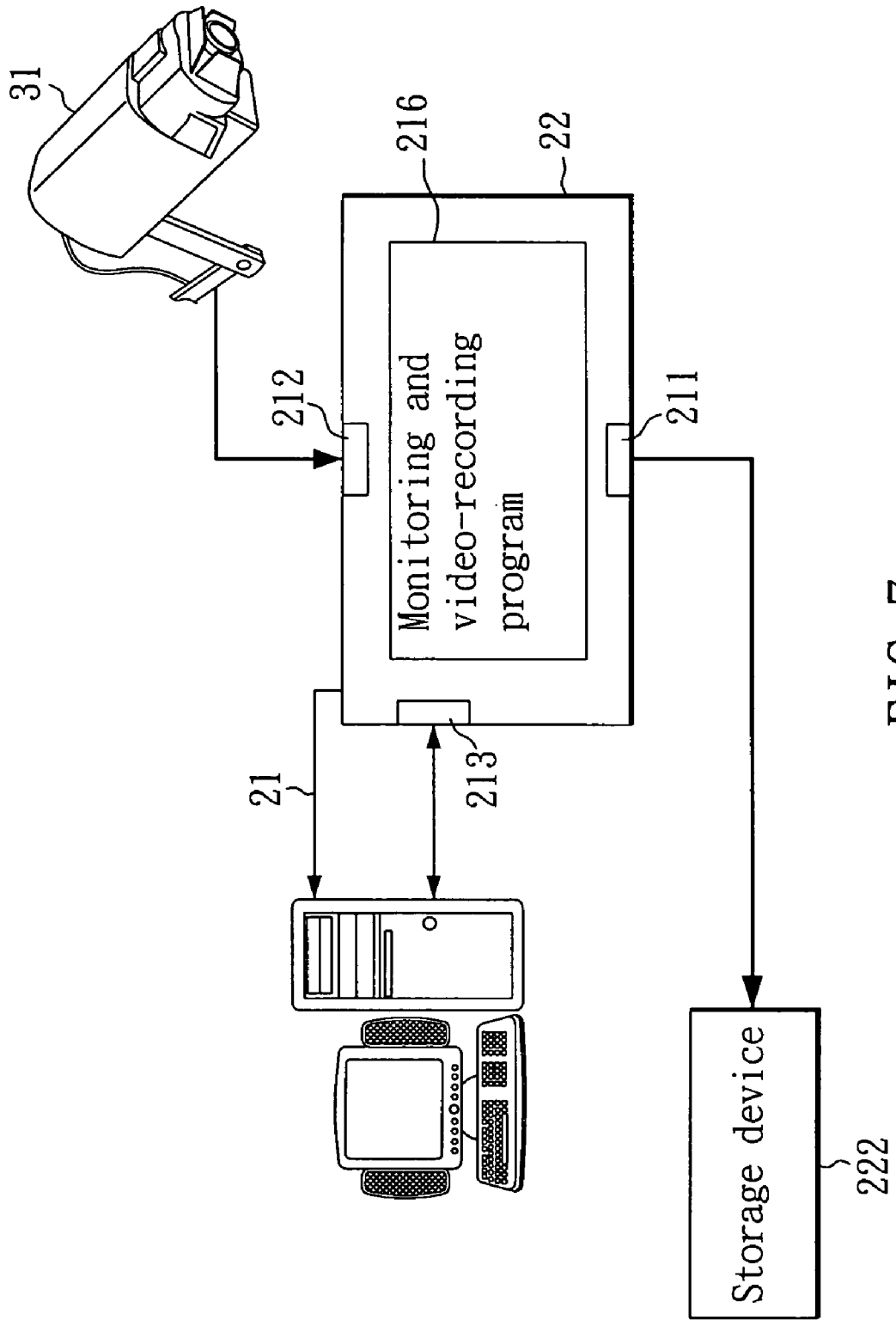
FIG. 7 is a diagram of a fifth application of FIG. 2 according to the invention.

FIG. 7 is a diagram of another application of the access device 21 of FIG. 2 according to the invention. As shown in FIG. 7, the second interface 212 of the access device 21 is a USB interface connected to a monitor camera 31. Accordingly, when the monitor camera 31 is monitoring and recording and the personal computer 22 at doze or shutdown, the controller 214 operated in the active mode obtains images captured by the monitor camera 31 through the USB interface according to a monitoring and video recording program in the memory 216 and stored in the storage device 222. The controller 214 finds a monitor event occurrence (for example, a person enters at an entrance) according to the images captured by the monitor camera 31, and sends a waking/activating signal through the control line 217 to wake up or activate the personal computer 22. The personal computer 22 can obtain the images captured by the monitor camera 31 through the third interface 213 and the second interface 212 and further perform image recognition (such as recognizing a visage of an entrant). Thus, the intellectual monitoring is obtained.

In view of the foregoing, it is known that the invented access device can read and move data of the storage device at computer shutdown, and allow the peripheral connection interfaces to work at computer shutdown or standby, which can be applied in, for example, system recovery when the computer cannot be powered on normally, automated data transmission and file management of an plug-in storage device at computer shutdown, and audiovisual data stream storage of a video recorder or monitor system.

Although the present invention has been explained in relation to its preferred embodiment, it is to be understood that many other possible modifications and variations can be made without departing from the spirit and scope of the invention as hereinafter claimed.

What is claimed is:

1. An access device capable of accessing storage devices in a computer, comprising:
   a controller;
   a first interface, which connects the controller to a storage device of the computer;
   a second interface, which connects the controller to a plug-in storage device;
   a third interface, which is a combination of the first interface and the second interface and connects the controller to the computer; and
   a power detector, which detects whether the computer is powered on or not, such that the controller bypasses the first interface and the second interface to the third interface when the computer is powered on, and the controller actively controls the storage device connected to the first interface and the plug-in storage device connected to the second interface for accessing the storage device and the plug-in storage device without using the third interface when the computer at doze or shutdown is detected.

2. The access device as claimed in claim 1, further comprising a memory, which stores programs and configuration data required by the controller for execution.

3. The access device as claimed in claim 2, wherein the controller is further connected to the computer through a control line in order to send an activating signal to power on the computer through the control line.

4. The access device as claimed in claim 2, wherein the first interface is an IDE, SATA, SCSI or IEEE 1394.

5. The access device as claimed in claim 2, wherein the second interface is a USB, SD, SDIO or CF interface.

6. The access device as claimed in claim 2, wherein the second interface is connected to a monitor camera such that when the monitor camera is monitoring and recording and the computer is at doze or shutdown, the controller obtains an image captured by the monitor camera through the second interface according to the programs and the configuration data stored in the memory and stores the image in the storage device.

7. The access device as claimed in claim 6, wherein the computer obtains the image captured by the monitor camera through the second interface and the third interface when the monitor camera is monitoring and recording and the computer is powered on, and stores the image in the storage device.

8. The access device as claimed in claim 2, wherein the second interface is connected to a USB portable disk or memory card such that when the computer is at doze or shutdown, the controller transfers files between the USB portable disk or memory card and the storage device or a BIOS of the computer through the second interface and the first interface.

9. The access device as claimed in claim 8, wherein the controller further performs encryption and decryption on the files transferred, thereby protecting data of the storage device.

10. The access device as claimed in claim 8, wherein the controller writes an operating system or BIOS program to the storage device or the BIOS through the second interface and the first interface.

11. The access device as claimed in claim 8, wherein the computer at power-on accesses files of the USB portable disk or memory card or transfers the files between the USB portable disk or memory card and the storage device through the second interface and the third interface.

12. The access device as claimed in claim 2, wherein the second interface is connected to a USB portable disk or memory card and the memory is set with an access priority of the access device to the storage device such that when the computer is at doze or shutdown, the controller transfers files between the USB portable disk or memory card and the storage device or a BIOS of the computer through the second interface and the first interface according to the access priority.

13. The access device as claimed in claim 2, wherein the second interface is connected to a PDA or MP3 player such that when the computer is at doze or shutdown, the controller compares files of the storage device and the PDA or MP3 player and accordingly transfers updated files between the PDA or MP3 player and the storage device or a BIOS of the computer through the second interface and the first interface.

14. The access device as claimed in claim 2, wherein the second interface is connected to a monitor camera such that when the monitor camera is monitoring and recording and the computer is at doze or shutdown, the controller obtains an image captured by the monitor camera through the second interface and stores the image in the storage device, and when a predetermined monitor event occurrence according to the image captured by the monitor camera is found, the controller sends an activating signal through a control line to power on the computer such that the computer obtains the image captured by the monitor camera through the third interface and the second interface for further image recognition.

15. The access device as claimed in claim 1, wherein the access device and the storage device are at doze or shutdown when the computer is at doze or shutdown, and the computer reserves the second interface at power-on such that when the plug-in storage device is inserted into the second interface, the second interface is activated to wake up or activate the access device and the storage device.

16. The access device as claimed in claim 1, further comprising a waking/activating switch, wherein the access device and the storage device are at doze or shutdown when the computer is at doze or shutdown, and are waken or activated by operating the waking/activating switch.

17. The access device as claimed in claim 16, wherein the waking/activating switch is a button, which is pressed by an operator or the plug-in storage device inserted to accordingly wake up or activate the access device and the storage device.

18. The access device as claimed in claim 16, wherein the waking/activating switch is a photoelectric switch, infrared or photosensor, which wakes up or activates the access device and the storage device through automatic sensing.

* * * * *